US007599945B2

(12) United States Patent
Ames et al.

(10) Patent No.: US 7,599,945 B2
(45) Date of Patent: Oct. 6, 2009

(54) DYNAMIC CLUSTER VISUALIZATION

(75) Inventors: Glen Anthony Ames, Mountain View, CA (US); Joshua Ethan Miller Koran, Mountain View, CA (US); Martin Moschitz, Oberzeiring (AT)

(73) Assignee: Yahoo! Inc., Sunnyvale, CA (US)

( * ) Notice: Subject to any disclaimer, the term of this patent is extended or adjusted under 35 U.S.C. 154(b) by 193 days.

(21) Appl. No.: 11/564,995

(22) Filed: Nov. 30, 2006

(65) Prior Publication Data

US 2008/0133567 A1 Jun. 5, 2008

(51) Int. Cl.
G06F 7/00 (2006.01)
G06F 17/00 (2006.01)
G06F 15/16 (2006.01)

(52) U.S. Cl. .................... 707/100; 707/102
(58) Field of Classification Search ............. 707/1–7, 707/100–102; 706/45–61; 715/10–36 R, 715/205–210, 243–253
See application file for complete search history.

(56) References Cited

U.S. PATENT DOCUMENTS

| | | | |
|---|---|---|---|
| 5,983,220 A | 11/1999 | Schmitt | |
| 5,986,673 A | 11/1999 | Martz | |
| 6,061,658 A | 5/2000 | Chou et al. | |
| 6,240,411 B1 | 5/2001 | Thearling | |
| 6,429,868 B1 | 8/2002 | Dehner, Jr. et al. | |
| 6,567,797 B1 | 5/2003 | Schuetze et al. | |
| 6,771,289 B1 | 8/2004 | Cadez et al. | |
| 6,976,212 B2 | 12/2005 | Newman et al. | |
| 7,043,463 B2 * | 5/2006 | Bonabeau et al. | 706/13 |
| 7,092,918 B1 * | 8/2006 | Delurgio et al. | 705/400 |
| 7,249,032 B1 * | 7/2007 | Close et al. | 705/1 |
| 7,249,033 B1 * | 7/2007 | Close et al. | 705/1 |
| 2003/0030637 A1 * | 2/2003 | Grinstein et al. | 345/420 |
| 2006/0136467 A1 * | 6/2006 | Avinash et al. | 707/102 |
| 2006/0195356 A1 * | 8/2006 | Nerenhausen et al. | 705/14 |
| 2007/0027858 A1 * | 2/2007 | Weinberg et al. | 707/4 |

* cited by examiner

*Primary Examiner*—Tony Mahmoudi
*Assistant Examiner*—Cecile Vo
(74) *Attorney, Agent, or Firm*—Beyer Law Group LLP

(57) ABSTRACT

A method for visually representing a plurality of clusters, the plurality of clusters comprising a plurality of entities with respect to a plurality of entity attributes is provided. The plurality of entities is segmented into the plurality of clusters, such that each individual entity belongs to at least one cluster. A plurality of entity data regarding the plurality of entities is processed to obtain a plurality of characteristics of each cluster of the plurality of clusters with respect to each entity attribute of the plurality of entity attributes. A visual display of the plurality of clusters with respect to the plurality of entity attributes is generated, such that for each cluster of the plurality of clusters and for each entity attribute of the plurality of entity attributes, a portion of the display represents at least two characteristics of the plurality of characteristics simultaneously for that cluster with respect to that entity attribute.

26 Claims, 2 Drawing Sheets

DYNAMIC CLUSTER VISUALIZATION

BACKGROUND

Marketing is the art of reaching the right people with the right messages at the right time. Since marketers generally cannot afford to craft unique messages for each individual target customer, they deal with large segments of each of their target markets at a time. Clustering is often used to help the marketers determine the desirable segments of customers for target marketing. While clustering can assign each individual customer to a specific cluster, it is useful for the marketers to find a set of customer attributes that uniquely identify one particular cluster of individuals from the other clusters of individuals, so that the marketers can use these customer attributes to target other individuals who also satisfy or possess these customer attributes. These attributes can also be used to identify good candidates for a particular goal (e.g., product purchase) among people who have not yet done the activity that measures the success of the marketer's goal.

The human brain has difficulty visualizing multi-dimensional data, especially when the number of dimensions exceeds five (three spatial, one color, and one size). One common method of displaying a visualization of clustering data is to project the data onto a three-dimensional map and use the spatial relationships to show the similarity among the individual clusters. While this method helps the marketers understand which clusters are most similar to which other clusters, this method of visualization generally does not enable the marketers to readily identify which customer attributes best differentiate each individual cluster from all other clusters.

SUMMARY

A method for visually representing a plurality of clusters comprising a plurality of entities with respect to a plurality of entity attributes is provided. The plurality of entities is segmented into the plurality of clusters, such that each individual entity belongs to at least one cluster. A plurality of entity data regarding the plurality of entities is processed to obtain a plurality of characteristics of each cluster of the plurality of clusters with respect to each entity attribute of the plurality of entity attributes. A display of the plurality of clusters with respect to the plurality of entity attributes is generated, such that for each cluster of the plurality of clusters and for each entity attribute of the plurality of entity attributes, a portion of the display represents at least two characteristics of the plurality of characteristics simultaneously for that cluster with respect to that entity attribute.

In another example, a computer program product for visually indicating a plurality of clusters comprising a plurality of entities with respect to a plurality of entity attributes, wherein each entity of the plurality of entities belongs to at least one cluster of the plurality of clusters, is provided. The computer program product comprises at least one computer-readable storage medium having computer program instructions stored therein. The computer program instructions are operable to cause at least one computer device to process a plurality of entity data regarding the plurality of entities to obtain a plurality of characteristics of each cluster of the plurality of clusters with respect to each entity attribute of the plurality of entity attributes, and generate a display of the plurality of clusters with respect to the plurality of entity attributes, such that for each cluster of the plurality of clusters and for each entity attribute of the plurality of entity attributes, a portion of the display represents at least two characteristics of the plurality of characteristics simultaneously for that cluster with respect to that entity attribute.

These and other features will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
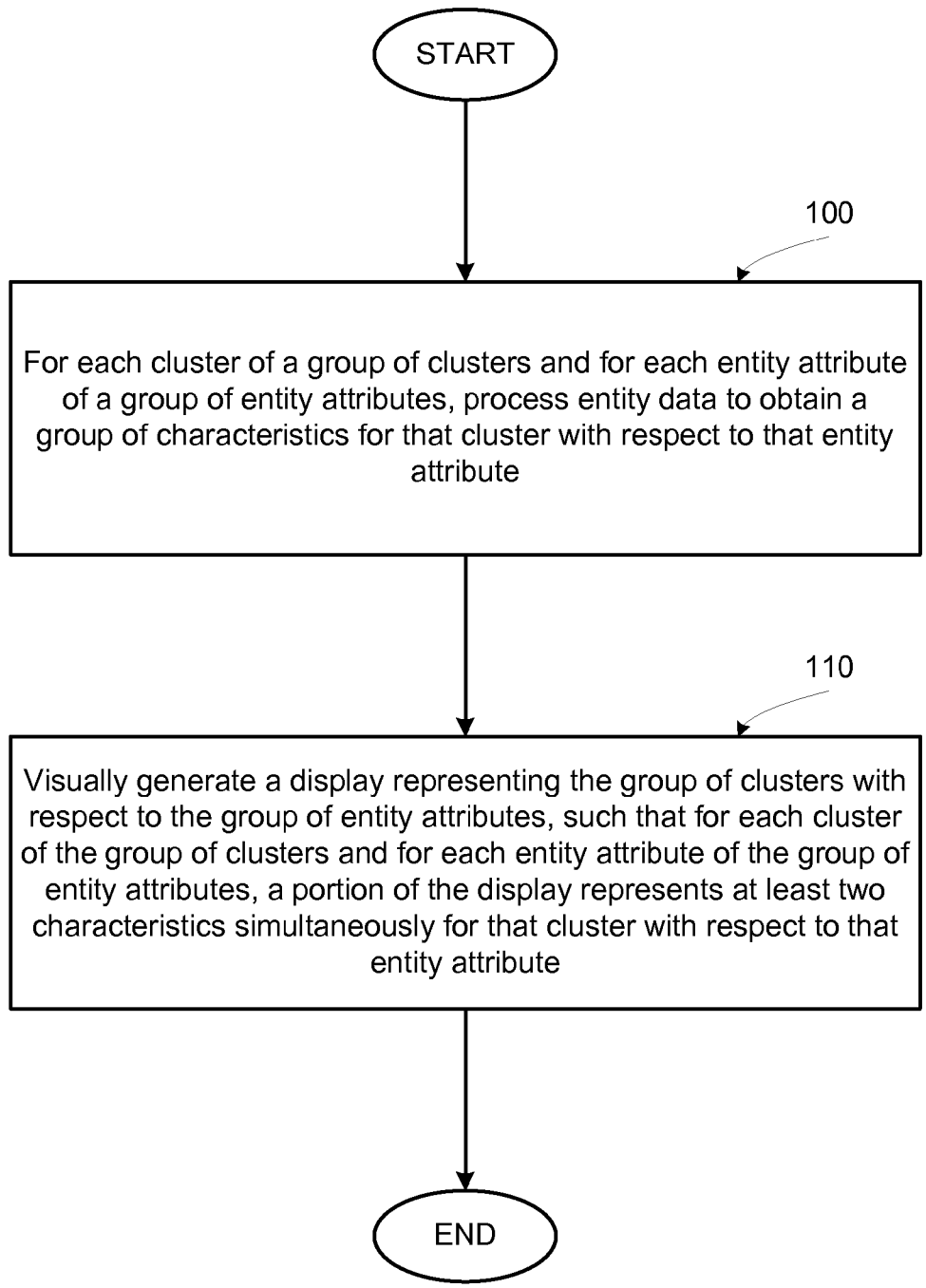
FIG. 1 is a high level flowchart of a method for visually generating a display of a plurality of entity attributes with respect to a plurality of clusters.

As described in the background, it is useful to segment entities into clusters for target advertisement. Note that in the context of marketing, an "entity" does not necessarily mean a person, although a person may certainly be entity. In addition, a entity may refer to a company, an institution, or any entity that may potentially be involved in commercial transactions. An entity may also refer to an advertisement, creative, or product that the marketers choose to indicate to their market, or user generated content. An entity, therefore, refers to any entity that marketers may wish to engage and to provide commercial information to or any entity that may be involved in the marketing or advertising activities.

In order to determine an appropriate set of entity attributes, where each entity attribute represents a unique characteristic of the target entities, for target marketing purposes, marketers often segment a group of sample entities into multiple clusters first, and then choose a cluster that includes those sample entities that satisfy or possess the desirable entity attributes for the marketers' specific requirements. The sample entities help the marketers choose the desirable set of entity attributes that best describe the characteristics of the marketers' target audience. In other words, the target audience includes those potential entities, in addition to the sample entities, which possess the desirable entity attributes. Then, the markers may use these entity attributes to identify their target audience for target marketing.

For example, the sample entities may be segmented into different clusters based on the characteristics of the entities, such as segmenting entities according to their respective age, or according to their respective residential location, or according to their respective hobby interest. Alternatively, sample entities may be segmented according to other types of criteria. One way of segmenting entities into different clusters is described in U.S. patent application, Ser. No. 11/550,709. Regardless of how the entities are segmented into different clusters, the purpose of this clustering process is to organize the entities according to similarities or dissimilarities among them so that they may be analyzed and visualized more readily. Therefore, entities belong to the same cluster usually share some similar characteristics, and each entity belongs to at least one cluster.

Once the entities have been segmented into clusters, it is desirable to have a method for visualizing clustering data in such a way that the visualization indicates the similarity or dissimilarity among the individual clusters as well as the characterization of each cluster with respect to the entity attributes.

An entity attribute represents a unique characteristic of the entities, and there may be multiple entity attributes representing multiple characteristics. Because the entities are segmented into multiple clusters based on their characteristics, the entity attributes may be used to differentiate each individual cluster from all other clusters. For example, an entity attribute that represents the age of the customers may be used to differentiate the customers into different age groups, such as children versus adults, or young adults versus middle-aged people. An entity attribute that represents the geographical location of the customers may be used to differentiate the customers into different geographical groups. An entity attribute that represents the gender of the customers may be used to differentiate the customers into two groups of male and female. An entity attribute that represents the hobby interest of the customers may be used to differentiate the customers into different special interest groups, such as sport versus art versus literature.

A visual display is used to show the marketers the characterization of each cluster with respect to each costumer attribute, in order to help the marketers identify which set of entity attributes best identify the cluster of entities that best satisfy the marketers' target marketing requirements.

FIG. 1 is a high level flowchart of a method for visually generating a display of a plurality of entity attributes with respect to a plurality of clusters. Referring to FIG. 1, at STEP 100, after the entities are segmented into multiple clusters based on their respective characteristics, where each entity belongs to at least one cluster, the entity data are processed to obtain multiple characteristics of each cluster with respect to each entity attribute. Generally, the characteristics of the entities relate to any type of information that is relevant or describes the entities. Conceptually, characteristics of the entities may describe information about entities in a broader or generic fashion, while the entity attributes may describe information about entities in a narrower and specific fashion. There are different ways to characterize a cluster with respect to an entity attribute. For example, one characteristic may indicate the number or the percentage of entities belong to each cluster who satisfy or possess a particular entity attribute. Another characteristic may indicate whether multiple clusters may be similar or dissimilar with respect to one or more specific entity attributes. For example, the characteristic may indicate the percent of a given entity attribute that occurs within each cluster. A third characteristic may show the overall relationship among the clusters with respect to a particular entity attribute. For example, the characteristic may indicate the relative frequency or index value of a given entity attribute that occurs within each cluster.

At STEP 110, a visual display is generated to show the multiple clusters and the multiple entity attributes, such that for each cluster, a portion of the display represents at least two characteristics of that cluster with respect to a particular entity attribute simultaneously. The display illustrates multi-dimensional data. The first dimension represents the multiple clusters. The second dimension represents the entity attributes. The third dimension represents the multiple characteristics of each cluster with respect to each entity attribute. In addition, the clusters or the entity attributes may be sorted according to any characterization (one or more entity attributes or a combination thereof).

Different aspects or features of the third dimension may be used to represent different characteristic of clusters with respect to the entity attributes. For example, the background colors of the third dimension may be used to identify similarity and dissimilarity among the clusters, such that clusters with the same or similar background colors are similar. On the other hand, the more different the background colors, the more dissimilar the clusters are from each other. The text value of the third dimension may be used to show information for each cluster, such as the number or the percentage of the entities within each cluster that satisfy or possess a particular entity attribute. The text font size, text font color, text font style may be used to show additional characteristics of the clusters with respect to the entity attributes. Multiple, delimited, text values may be added in the third dimension to show additional characteristics for each cluster with respect to the entity attributes.

Figure 2:
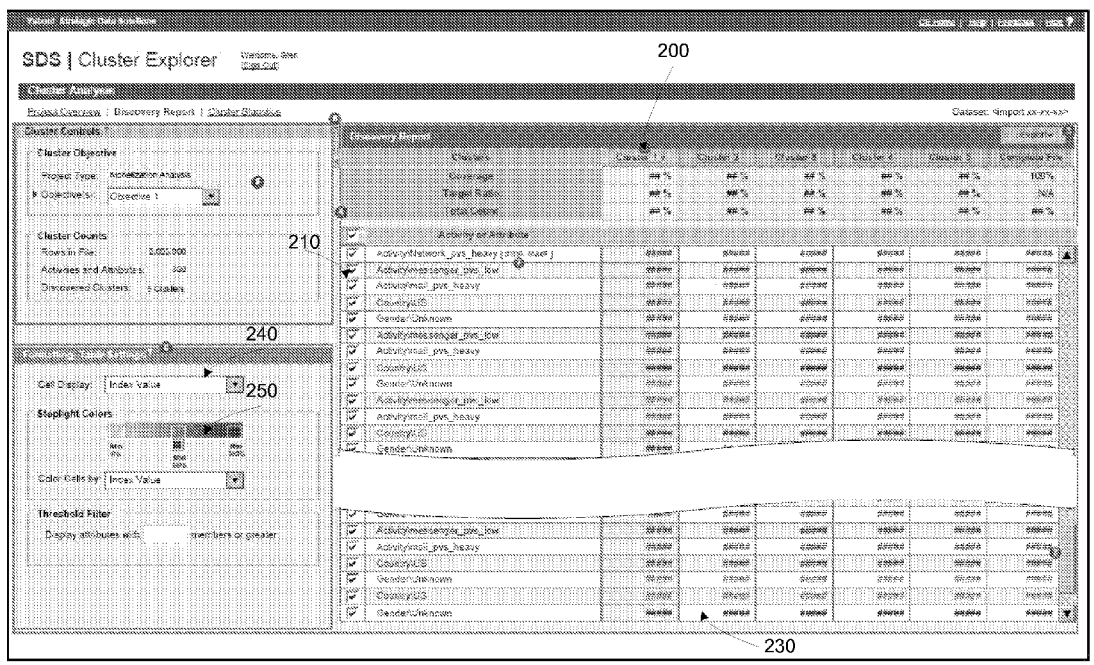
FIG. 2 shows an example of a display in tabular format representing multiple characteristics for multiple clusters with respect to multiple entity attributes.

To further illustrate the concept of multi-dimensional data visualization, FIG. 2 shows an example of a visual display in tabular format representing multiple characteristics for multiple clusters with respect to multiple entity attributes. In this example, the entities are segmented into five clusters. The first dimension 200, which is the columns, represents the five clusters. The second dimension 210, which is the rows, represents the entity attributes, listed in alphabetical order. The third dimension, which is the cells 230, represents various characteristics of the clusters with respect to the entity attributes. The text itself, value (or values), background color, text font size, text font color, and text font style of the cells 230, each may be used to represent a different characteristic of the clusters with respect to the entity attributes. Thus, multiple characteristics may be shown simultaneously.

For example, the value in each cell 230 may indicate the number or percentage of the entities in the cluster represented by the column to which that cell belongs who satisfy or possess the entity attribute represented by the row to which that cell belongs. At the same time, the text font size in each cell 230 may indicate the percentage of entities in each cluster with respect to the total number of entities in all clusters. Marketers may choose what specific characteristic is to be displayed in the cells 230 by selecting that characteristic from a list of available characteristics 240.

The background colors of the cells 230 may indicate the similarity or dissimilarity of the clusters, such that cells 230 with similar colors have similar characteristics. To provide a better visual aid to marketers, marketers may specify multiple colors to differentiate the clusters using a sliding bar 250. For example, one color may be used to represent 0% similarity (no similarity at all), while a different color is used to represent 100% similarity (completely similar). A third, threshold color may be specified to represent a threshold level. The threshold level is adjustable between 0% and 100%, and the threshold level is set to 50% by default. For example, if a marketer is only interested in data between 70% and 100%, then he may set the threshold level at 70% so that important data between 70% and 100% are displayed in more detail, while less important data between 0% and 70% are displayed in less detail. Further, marketers may choose to display the colors in a smooth, continuous gradation between 0% and 100% or in a stepped fashion. The marketers may specify the number of steps displayed such that a fixed number of discrete colors are used between 0% and 100%.

To further illustrate, assume the marketer chooses the color "red" to represent 0% similarity, the color "green" to represent 100% similarity, and the color "yellow" to represent threshold set at 50%. If the marketer chooses gradation display, then the transition from red to yellow and yellow to green would be smooth and continuous. On the other hand, if the marketer chooses step display with 3 steps for each transition, then the transition from red to yellow would take 3 steps using 3 different colors between red and yellow, and the transition from yellow to green would also take 3 steps using 3 different colors between blue and green.

The methods described herein may be carried out, for example, in a programmed computing system. For example, the programmed computing system may execute instructions stored in a computer-readable storage medium.

The methods described above have various advantages over the prior art. First, multiple characteristics of multiple clusters with respect to multiple entity attributes may be displayed simultaneously, which gives marketers an all-inclusive image of the entity data being analyzed. Second, marketers can readily see the relationships among the multiple clusters and multiple entity attributes, and therefore can better understand the tradeoff between using one set of entity attributes versus another set of entity attributes to identify their target entities.

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A method for visually representing a plurality of clusters, the plurality of clusters comprising a plurality of entities with respect to a plurality of entity attributes, wherein each entity of the plurality of entities belongs to at least one cluster of the plurality of clusters, comprising:

processing a plurality of entity data to determine a plurality of characteristics for each cluster of the plurality of clusters with respect to each entity attribute of the plurality of entity attributes; and causing a display to be generated representing the plurality of clusters with respect to the plurality of entity attributes, such that for each cluster of the plurality of clusters and for each entity attribute of the plurality of entity attributes, a separate portion of the display corresponding to that cluster and that entity attribute represents at least two characteristics of the plurality of characteristics simultaneously for that said each cluster with respect to that said each entity attribute, with textual content in the separate portion of the display representing a first of the two characteristics and display characteristics of the textual content in the separate portion of the display representing a second of the two characteristics, wherein the display comprises:

a first dimension representing the plurality of clusters, such that said each cluster is represented by a unique portion of the first dimension;

a second dimension representing the plurality of entity attributes, such that said each entity attribute is represented by a unique portion of the second dimension;

wherein, each separate portion of the display, representing said each cluster of the plurality of clusters and said each entity attribute of the plurality of entity attributes, is an area of the display defined by the unique portion of the first dimension representing that said each cluster and by the unique portion of the second dimension representing the said each entity attribute; and the display further comprises a third dimension representing the plurality of characteristics, such that each unique portion of the third dimension is characterized by the textual content in the separate portion of the display and the display characteristics of the textual content in the separate portion of the display, to represent the at least two characteristics of the plurality of characteristics simultaneously for said each cluster of the plurality of clusters with respect to said each entity attribute of the plurality of entity attributes; and wherein the third dimension is the intersection of the first dimension and the second dimension, such that an intersection of a portion of the first dimension and a portion of the second dimension forms the portion of the third dimension representing the at least two characteristics of the plurality of characteristics simultaneously for said each cluster represented by the portion of the first dimension with respect to said each entity attribute represented by the portion of the second dimension.

2. The method, as recited in claim 1, wherein the display characteristics of the textual content, representing the second of the two characteristics, includes at least one of the characteristics selected from the group consisting of: text background color, text font size, text font color, and text font style.

3. The method, as recited in claim 1, wherein for said each entity attribute of the plurality of entity attributes, one of the two characteristics represented in the separate portion of the display is a percentage of entities belonging to said each cluster of the plurality of clusters that possesses said each entity attribute.

4. The method, as recited in claim 1, wherein for said each entity attribute of the plurality of entity attributes, one of the two characteristics represented in said each separate portion of the display is a number of entities belonging to said each cluster of the plurality of clusters that possesses that said each entity attribute.

5. The method, as recited in claim 1, wherein for each entity attribute of the plurality of entity attributes, one of the two characteristics represented in the separate portion of the display is a frequency of that said each entity attribute occurring in said each cluster of the plurality of clusters.

6. The method, as recited in claim 1, wherein the second of the two characteristics represented in the separate portion of the display, represented by display characteristics of the textual content in said each separate portion of the display, visually identifies similarity and dissimilarity among the plurality of clusters using a plurality of colors.

7. The method, as recited in claim 6, wherein the plurality of colors are continuous within a gradient color range.

8. The method, as recited in claim 6, wherein the plurality of colors are stepped within a gradient color range.

9. The method, as recited in claim 6, further comprising:

selecting and adjusting a threshold color for the similarity and dissimilarity among the plurality of clusters for easy visualization of the similarity and dissimilarity among the plurality of clusters.

10. The method, as recited in claim 1, further comprises:

sorting the plurality of clusters with respect to the plurality of entity attributes to obtain a plurality of sorted clusters; and displaying the plurality of sorted clusters with respect to the plurality of entity attributes.

11. The method, as recited in claim 1, further comprising:

sorting the plurality of entity attributes with respect to the plurality of clusters to obtain a plurality of sorted entity attributes; and displaying the plurality of sorted entity attributes with respect to the plurality of clusters.

12. The method, as recited in claim 11, wherein sorting the plurality of entity attributes with respect to the plurality of clusters to obtain a plurality of sorted entity attributes includes:

sorting the plurality of entity attributes sequentially with respect to the plurality of clusters to obtain a plurality of sorted entity attributes.

13. The method, as recited in claim 12, wherein sorting the plurality of entity attributes sequentially with respect to the plurality of clusters to obtain a plurality of sorted entity attributes includes:

sorting the plurality of entity attributes with respect to each and every cluster of the plurality of clusters in sequence.

14. A computer program product for visually representing a plurality of clusters, the plurality of clusters comprising a plurality of entities with respect to a plurality of entity attributes, wherein each entity of the plurality of entities belongs to at least one cluster of the plurality of clusters, the computer program product comprising at least one computer-readable storage medium having computer program instructions stored therein, wherein the computer program instructions are operable to cause at least one computer device to:

process a plurality of entity data to determine a plurality of characteristics for each cluster of the plurality of clusters with respect to each entity attribute of the plurality of entity attributes; and cause a display to be generated representing the plurality of clusters with respect to the plurality of entity attributes, such that for each cluster of the plurality of clusters and for each entity attribute of the plurality of entity attributes, a separate portion of the display corresponding to that said each cluster and that entity attribute represents at least two characteristics of the plurality of characteristics simultaneously for that cluster with respect to that said each entity attribute, with textual content in the separate portion of the display representing a first of the two characteristics and display characteristics of the textual content in the separate portion of the display representing a second of the two characteristics, wherein the display comprises:

a first dimension representing the plurality of clusters, such that said each cluster is represented by a unique portion of the first dimension;

a second dimension representing the plurality of entity attributes, such that said each entity attribute is represented by a unique portion of the second dimension;

wherein, each separate portion of the display, representing said each cluster of the plurality of clusters and a said each entity attribute of the plurality of entity attributes, is an area of the display defined by the unique portion of the first dimension representing that said each cluster and by the unique portion of the second dimension representing the said each entity attribute; and the display further comprises a third dimension representing the plurality of characteristics, such that each unique portion of the third dimension is characterized by the textual content in the separate portion of the display and the display characteristics of the textual content in the separate portion of the display, to represent the at least two characteristics of the plurality of characteristics simultaneously for said each cluster of the plurality of clusters with respect to said each entity attribute of the plurality of entity attributes; and wherein the third dimension is the intersection of the first dimension and the second dimension, such that an intersection of a portion of the first dimension and a portion of the second dimension forms the portion of the third dimension representing the at least two characteristics of the plurality of characteristics simultaneously for said each cluster represented by the portion of the first dimension with respect to said each entity attribute represented by the portion of the second dimension.

15. The computer program product, as recited in claim 14, wherein the display characteristics of the textual content, representing the second of the two characteristics, includes at least one of the characteristics selected from the group consisting of: text background color, text font size, text font color, and text font style.

16. The computer program product, as recited in claim 14, wherein for each said entity attribute of the plurality of entity attributes, one of the two characteristics represented in said each separate portion of the display is a percentage of entities belonging to said each cluster of the plurality of clusters that possesses that said each entity attribute.

17. The computer program product, as recited in claim 14, wherein for each entity attribute of the plurality of entity attributes, one of the two characteristics represented in said each separate portion of the display is a number of entities belonging to said each cluster of the plurality of clusters that possesses that said each entity attribute.

18. The computer program product, as recited in claim 14, wherein for each entity attribute of the plurality of entity attributes, one of the two characteristics represented in said each separate portion of the display is a frequency of that entity attribute occurring in said each cluster of the plurality of clusters.

19. The computer program product, as recited in claim 14, wherein the second of the two characteristics represented in the separate portion of the display, represented by display characteristics of the textual content in said each separate portion of the display, visually identifies similarity and dissimilarity among the plurality of clusters using a plurality of colors.

20. The computer program product, as recited in claim 19, wherein the plurality of colors are continuous within a gradient color range.

21. The computer program product, as recited in claim 19, wherein the plurality of colors are stepped within a gradient color range.

22. The computer program product, as recited in claim 19, further comprising computer program instructions to:

select and adjust a threshold color for the similarity and dissimilarity among the plurality of clusters for easy visualization of the similarity and dissimilarity among the plurality of clusters.

23. The computer program product, as recited in claim 14, further comprising computer program instructions to:

sort the plurality of clusters with respect to the plurality of entity attributes to obtain a plurality of sorted clusters; and display the plurality of sorted clusters with respect to the plurality of entity attributes.

24. The computer program product, as recited in claim 14, further comprising computer program instructions to:

sort the plurality of entity attributes with respect to the plurality of clusters to obtain a plurality of sorted entity attributes; and display the plurality of sorted entity attributes with respect to the plurality of clusters.

25. The computer program product, as recited in claim 24, wherein sort the plurality of entity attributes with respect to the plurality of clusters to obtain a plurality of sorted entity attributes includes computer program instructions to:

sort the plurality of entity attributes sequentially with respect to the plurality of clusters to obtain a plurality of sorted entity attributes.

26. The computer program product, as recited in claim 25, wherein sort the plurality of entity attributes sequentially with respect to the plurality of clusters to obtain a plurality of sorted entity attributes includes computer program instructions to:

sort the plurality of entity attributes with respect to each and every cluster of the plurality of clusters in sequence.

* * * * *